Dec. 23, 1941.  W. C. HOLSTEIN  2,267,563

CHAIN-LINK JIG

Filed Nov. 4, 1939

INVENTOR
BY William C. Holstein
Wheeler, Wheeler & Wheeler
ATTORNEYS.

Patented Dec. 23, 1941

2,267,563

UNITED STATES PATENT OFFICE 2,267,563

CHAIN-LINK JIG

William C. Holstein, Madison, Wis.

Application November 4, 1939, Serial No. 302,871

4 Claims. (Cl. 59—13)

My invention relates generally to jigs and more particularly it relates to jigs adapted for use in interfitting and disengaging terminal hook links of articulated chain.

Chain belting of the type comprising links having interfitted terminal hooks forming rolling connections is widely used on farm and machine shop equipment, and on industrial machines and other mechanisms. Links of this type are joined by sliding one link laterally with respect to an adjacent link. Considerable force must frequently be applied to effect joining or separation of the links, hence an operator may encounter difficulty unless one link is securely held while the other link is forced laterally thereof. While a vise may be advantageously used to hold one of the links when the chain is removed from its associated machine, it is apparent that other means must be employed when the chain is being installed on or removed from its associated mechanism. The bar of one link must be held in alignment with the slot of a companion link to effect separation or joinder of the links. To accomplish this against the normal tension of an installed chain is extremely difficult without the proper tool.

I am aware that devices adapted for use in holding chain links of the above described type have heretofore been devised, but all such devices as have come to my attention are either devised for use with one particular type of link or are so expensive to construct as to discourage their general use. My improved jig is adapted for use with all link chain of the type described regardless of the particular construction of the interfitted terminals.

Further, the jig is adapted to be held in the hand of an operator or to be braced against a solid portion of a machine while repairs are being made. An ideal chain holding jig must not only be strong and adapted to grip a link in a positive manner, but it must be light in weight and relatively small in size. The weight factor is important from the angle of portability and especially so if the jig is constructed of such weight and size as to enable an operator to carry it in his pocket. Many machines are so constructed as to allow only a small amount of space between a chain belt of the above described type and the various parts of the machine. To ensure easy removal and installation of links on a machine of this type, a chain link holder adapted to fit within a limited space is required. It is sometimes necessary to twist the chain to properly position the links for removal and it is very important that the jig grips the link in such a manner as to distribute stress over a large surface area to prevent permanent distortion of the link during the twisting operation.

It is therefore the primary object of my invention to provide an improved inexpensive jig adapted for use with links of various shapes and sizes.

A further object of my invention is to provide a link holding jig having main structural portions easily detachable from one another and adapted to be clamped together in "knock down" relation during non-use whereby to require a minimum amount of storage space in a tool box or in the pocket of a user.

Another object of my invention is to so attach a link receiving jig element to its base by means of an improved detachable connection that the jig is in full abutment with the base, and the connection, while performing an adequate connective function, neither interferes with the full abutment referred to nor sustains injurious shock in the working of the device.

Further objects of my invention will become apparent upon examination of the specification, drawing and appended claims.

Figure 4:
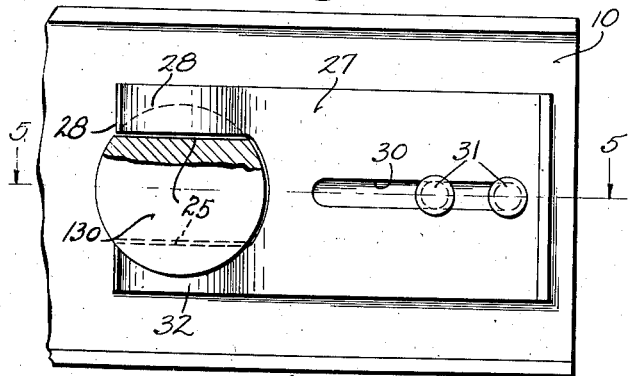

Fig. 4 discloses alternate means for removably securing the link holding member to the base.

Figure 5:
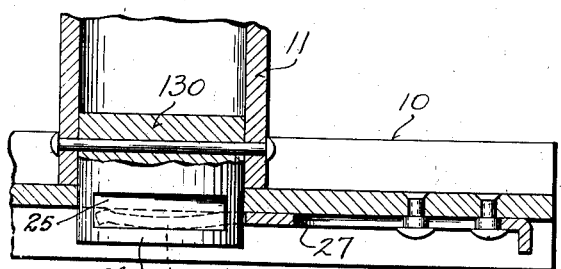

Fig. 5 is a section taken along line 5—5 of Fig. 4.

Figure 6:
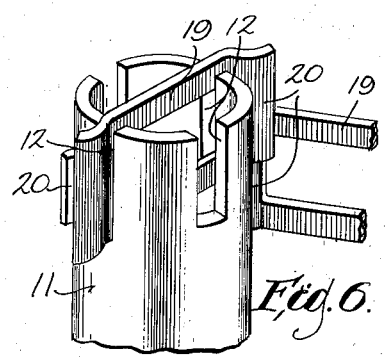

Fig. 6 discloses a chain link of the described type partially disposed within the notched portion of the jig.

Like parts are identified by the same reference characters throughout the several views.

Figure 1:
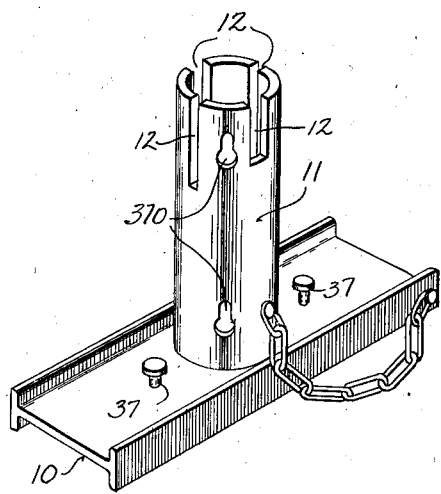
Fig. 1 is a perspective view of my improved jig.

Main structural elements of my invention include a base member 10 which is preferably constructed from I-beam stock and a tubular member 11 which may be either permanently or removably mounted thereon. As shown in Fig. 1, tubular member 11 is provided at its free end with at least two, and preferably four, axially extending slots 12. Slots 12 are provided in pairs, the slots comprising each pair being diametrically opposed. Any one pair of slots is adapted to receive the flat portion of a chain link as illustrated in Fig. 6. Each diametrically opposed pair of slots 12 varies both in width and axial length from the other pairs as shown, whereby the jig may be used on chain of widely varying size and shape.

While the jig is ordinarily used in the manner illustrated in Fig. 6, wherein the flat portion 19 of a single link is disposed in one pair of slots with connecting terminal portion 20 in the position indicated, the jig may also be used on chain having flat link portions narrower than the diameter of tubular member 11 by straddling the jig over two links while installation or removal of a third and adjoining link is effected. Each pair of slots 12 is of sufficient axial length to receive both sides of a chain link and hence an operator may twist or turn the link or otherwise subject it to considerable stress without deforming the link.

The jig performs a dual function, namely, it provides means enabling an operator to apply a twisting force of considerable magnitude to one link to position that link for installation or removal of a companion link, and it provides support means for holding an engaged link firmly while the operator drives the companion link into or out of engagement therewith.

It is apparent that the base 10 and tubular member 11 may be permanently joined in the position shown in Fig. 1 by welding, brazing or otherwise connecting said tubular member to the top surface of the base in the position shown. To facilitate compactness, as above described, I provide means for removably mounting tubular member 11 on base 10 to permit "knock down" of the unit during periods of non-use. I have found that provision of a threaded joint between the members, which would be the simplest expedient, is unsatisfactory for this purpose because unless the members are tightened together with means other than the hands of the user, the threads become damaged during use of the device. Much time is saved on the part of an operator if the jig is easily assembled and disassembled without the use of tools and I have, therefore, provided means whereby I obtain this end.

Figure 2:
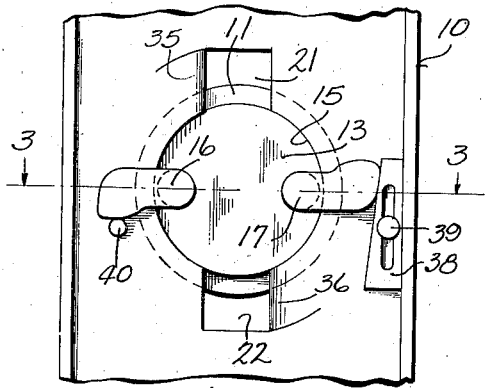
Fig. 2 is a bottom plan view of my invention disclosing my preferred means for removably securing the link holding portion to the base.
Figure 3:
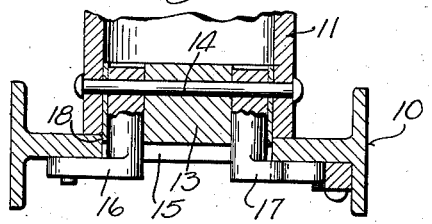
Fig. 3 is a section taken along line 3—3 of Fig. 2.

While it would be comparatively simple to devise a detachable connection between the members wherein the walls of the tubular member engage portions of the apertured base in substantial bayonet fashion, such a connection has been carefully avoided firstly, because it would reduce the effective abutting area between the members and secondly, because of the probability that such a connection would not stand the severe hammering and twisting strains to which a device of this type is subjected. It will be noted that forces set up in the link holding member are transmitted directly to the base and not to the connection in the preferred embodiment of the invention shown in Figs. 2 and 3 and hereinafter described.

Plug 13 carries a pair of bayonet type engagement lugs 16 and 17 and has a substantial portion inserted in cylindrical tube 11 and secured thereto by rivet 14 or by other suitable means. A portion 18 projects downwardly from said member. Base 10 is provided with an aperture 15 of generally circular shape but having diametrically opposed marginal notches 21 and 22 to allow lugs 16 and 17 to be projected through the base during engagement and disengagement of the members. Portion 18 is disposed within aperture 15 in contact with the circular portions of the walls thereof to provide added means to maintain tubular portion 11 in a position upright in respect to base 10. Base portions 35 and 36 adjacent one side of each notch 21 and 22, respectively, are tapered to aid the lugs in riding on to the flat base surface. The lugs are of such dimension as to ensure a tight fit with the base, but do not fit so tightly as to necessitate the use of tools by an operator in assembling the device.

A wedge-shaped slotted member 38 is slidably mounted on the under side of base 10 by means of rivet 39 in position to engage lug 17 and provide locking means whereby to prevent the tubular member from disengaging from the base during use. A peg 40 is provided to restrict movement of lugs in a counterclockwise direction as viewed in Fig. 2.

Figs. 4 and 5 disclose another embodiment of my invention wherein the link receiving member 11 is provided with other means for detachable mounting to base 10. In place of bayonet lugs, as described above, plug 130 has an extended portion 24 provided with a pair of flat walled grooves, or channels 25, the inner vertical walls thereof being in parallel relation. An engagement plate 27 has a bifurcated end portion 28 which is adapted to snugly receive the channeled portion of plug 130 in forked engagement therewith and to prevent rotation of the tubular member in respect to the base. Plate 27 is further provided with an elongated slot 30 through which rivets 31, which are anchored to base 10, project to provide means for slidably mounting said plate on the bottom surface of the base. Bifurcated end portion 28 of the plate 27 is deformed at 32 to provide spring means for biasing member 11 and thereby insuring proper engagement with base 10. Detachment of the members is obtained by simply sliding plate 27 to the right as viewed in Figs. 4 and 5.

Because it is often necessary to apply a twisting force or torque of considerable magnitude to one chain link to position it for engagement or disengagement with an adjacent link, as when a link belt has little slack, it is desirable to provide the base member 10 of sufficient length to enable a user to firmly grasp it with both hands. In the above described embodiment disclosing removable link holding members, the element providing removable mounting to the base must be sufficiently strong to withstand this torque.

Upon detachment of member 11 from base 10, the parts may be clamped together in "knock-down" form by means of a slip joint by insertion of the heads of rivets 37 through the enlarged portions of apertures 370 and then sliding the members to dispose the shank portions of the rivets in the reduced portions of apertures 370.

I claim:

1. A chain-link holder including a base and a tubular member said tubular member having one end slotted to engage the side flanges of a chain-link and having one side and its other end provided with means for interlocking the tubular member in either a vertical working position or in a "knock down" storage position to said base.

2. In a device for individually twisting the connecting links of a chain comprising links provided with rolling connections and having intermediate flat portions, an elongated tubular member having an outside diameter substantially equal to the length of the flat portion of the link to be twisted, one end of said tubular portion provided with a radially extending base for the manual manipulation of the device and the opposite end provided with a pair of diametrically opposed axially extending generally rectangular slots having longitudinal dimensions slightly greater than the width of said link, the width of said slots being slightly greater than the thickness of the link, whereby the flat link portion may be substantially disposed within said slotted portion to provide an even distribution of pressure between the tubular member and portions of the link adjacent the rolling connections during a twisting operation.

3. A device as set forth in claim 2, wherein said tubular member is provided with a plurality of pairs of diametrically opposed link receiving slots, each pair of slots varying in dimension from the other pairs, whereby the device may be used on chain links of varying sizes.

4. A device as set forth in claim 2, wherein the base is removably detachable from the tubular portion to provide means for disassembling the device to facilitate storage thereof.

WILLIAM C. HOLSTEIN.